Jan. 27, 1925.  1,524,545

F. F. FORSHEE
INSTRUMENT STERILIZER
Filed Dec. 14, 1920

WITNESSES:
H. T. Shelhamer
N. M. Bielel

INVENTOR
Frank F. Forshee
BY
Wesley G. Carr
ATTORNEY

Patented Jan. 27, 1925.

1,524,545

UNITED STATES PATENT OFFICE.

FRANK F. FORSHEE, OF FLINT, MICHIGAN, ASSIGNOR TO WESTINGHOUSE ELECTRIC PRODUCTS COMPANY, A CORPORATION OF MICHIGAN.

INSTRUMENT STERILIZER.

Application filed December 14, 1920. Serial No. 430,626.

*To all whom it may concern:*

Be it known that I, FRANK F. FORSHEE, a citizen of the United States, and a resident of Flint, in the county of Genesee and State of Michigan, have invented a new and useful Improvement in Instrument Sterilizers, of which the following is a specification.

My invention relates to electrically heated apparatus and particularly to fluid heaters and it has for one of its objects to provide an electrically heated sterilizer which may be removed from the heating element which normally supports it.

Another object is to provide a sterilizer with a combined lifting-and-carrying and cover-actuating member.

Another object is to provide relatively simple means for moving a tray located in the sterilizer into and out of the fluid in said sterilizer.

In practising my invention, I provide an electric stove having suitable supporting members and place thereon a covered fluid container in which is located a vertically movable instrument tray. A handle member or bail is pivotally mounted on said container and is provided with means whereby it may actuate the cover to its closed or its open position and is also provided with means whereby it may raise and lower the instrument tray in accordance with its angular position on said container.

Figure 1:
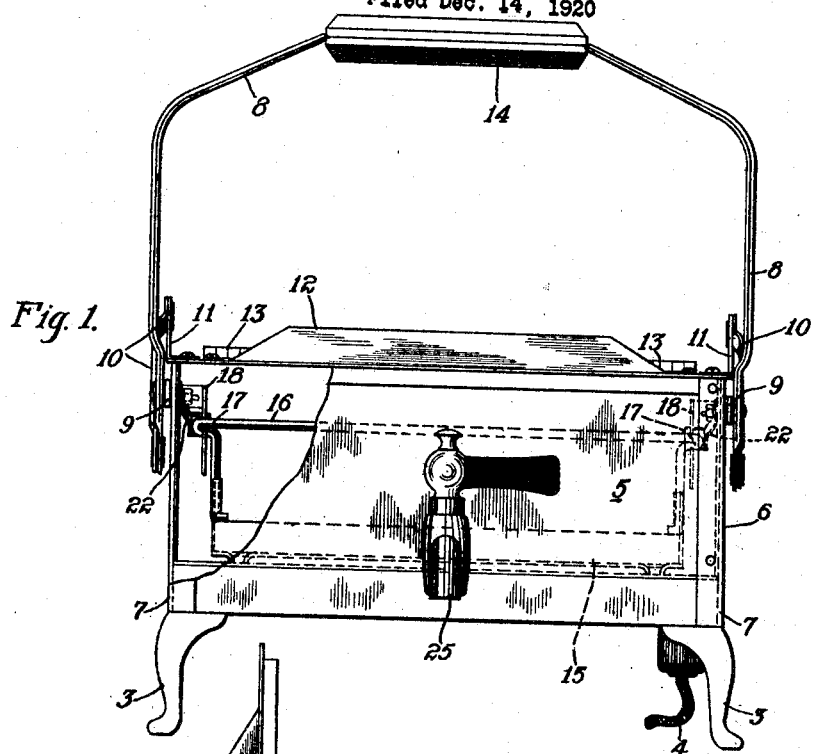
Figure 2:
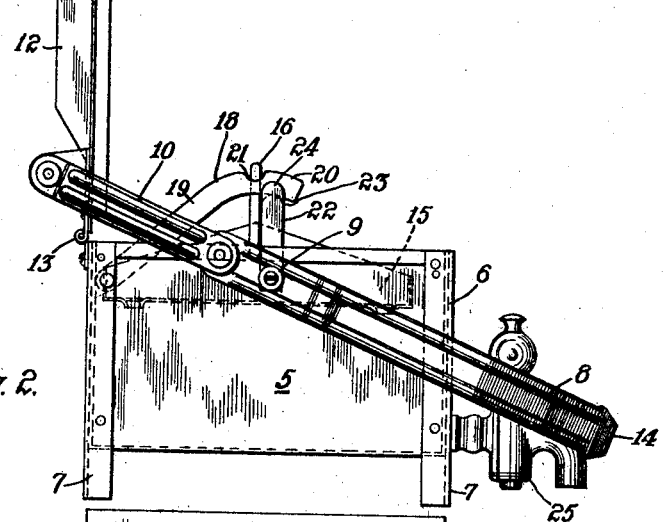

In the single sheet of drawings,

Figure 1 is a view, in front elevation, of a device embodying my invention, certain parts being cut away, and Fig. 2 is a view, in side elevation, of a device embodying my invention, with the cover in its open position and shown as being raised from its normal position on the heating means.

A heating means 1 comprises a substantially horizontal stove frame 2, mounted on supporting members 3. A heating element (not shown) is located in the frame 2 and may be energized by means of suitable supply conductors 4.

A sterilizer 5 comprises a container 6 which is here indicated as substantially rectangular in form. The outline is not essential except in so far as it is desirable that its outline shall conform to the outline of the heating means 1.

The container 6 is provided with a plurality of downwardly extending supporting members 7 which are here shown as being of L section so that they may locate the container 6 in its proper operative position on the heating means 1 when it is desired to heat a fluid placed in the container. The supporting members 7 are adapted to support the container 6 on any suitable surface when it is desired to remove the container 6 from the heating means 1 and place it upon such surface.

A container-carrying means or bail 8, is pivotally mounted on opposite sides of the container 6 by pins 9. The ends of the bail extend beyond the pivot pins 9 and are pivotally connected to the inner ends of links 10, the outer ends of which are pivotally connected to upstanding lugs 11 secured to a cover 12. The cover 12 is pivotally mounted on the rear upper edge of the container 6 by means of hinges 13. The relative lengths of the side portions of the bail 8, their relation to the pivot 9 and the lengths of the links 10 are such that, when the bail 8 is in a substantially vertical position on the container 6, the cover 12 is in its closed position.

When the top of the bail 8 is moved forwardly and downwardly into substantially the position indicated in Fig. 2, it actuates the cover to its open position, substantially as indicated.

If desired, the bail 8 may be provided with a handle grip 14 of wood or other suitable material.

An instrument tray 15 is located in the container 6 and is of substantially the same contour. A handle 16, of substantially U-shape is provided for the tray 15, the end portions of which are suitably secured to the sides of the tray. The handle 16 is provided with return-bend portions 17 which extend longitudinally outward for a purpose to be hereinafter set forth.

Link members 18 are pivotally mounted on the inside of the side walls of the casing 6 near the rear thereof. Each of the link members 18 comprises a straight portion 19 and an arcuate portion 20 having a notch 21 in the upper edge thereof. The return-bend portions 17 of the handle member 16 are adapted to rest in the notches 21 to support the tray in a plurality of positions in the container 6.

A lever 22 is secured to each of the pivot pins 9 and is located in definite angular relation to the side portions of the bail 8. The outer end of the lever 22 is provided with a rounded surface 23 and with a relatively small extension-lug 24 in order that it may co-operate with the levers 18 to raise and lower the tray in accordance with the angular position of the bail 8 on the container 6. The degree of curvature of the portion 20 of the lever 18, the length of the lever 22 and the angular position thereof with relation to the bail 8 are so selected that, when the bail 8 is in a substantially vertical position, the tray 15 is in the position indicated in Fig. 1, and the rounded end 23 of the lever 22 is in operative engagement with a predetermined portion of the straight part 19 of the lever 18. If the handle member 8 is now moved forwardly and downwardly, the lever 22 actuates the lever 18 to raise the free end thereof in an upward direction on its pivot. This raises the tray 15 until it occupies substantially the position indicated in Fig. 2.

A faucet 25 is provided to permit of emptying the fluid from the container 6, if so desired.

It may be noted that the device shown and described provides a quickly removable sterilizer having a combined carrying, cover-raising, and tray-elevating means.

In case it is desired to use the stove for other purposes, such as drying plaster molds, the container may be easily and quickly removed from the stove itself. It may also be noted that relatively simple means are provided for elevating the tray in accordance with the position of the carrying member in relation to the container itself.

Various modifications may be made without departing from the spirit and scope of my invention, and I desire that only such limitations shall be placed thereon as are imposed by the prior art or are specifically set forth in the appended claims.

I claim as my invention:

1. A portable fluid container comprising a container-carrying means pivotally secured to said container, a cover member for said container, a vertically movable tray in said container, and means directly connected to said container-carrying means for varying the position of said cover and of said tray in accordance with the angular position of said container-carrying means relatively to said container.

2. A portable fluid container comprising a cover member, a vertically movable tray in said container, a carrying-bail pivotally mounted on said container, link members pivotally connected to said bail and said cover for varying the angular position of said cover in accordance with the position of the bail, link members pivotally mounted on the inside of the container and continuously engaging said tray, and means directly connected to said bail and operatively engaging said second link members for raising and lowering said tray in accordance with the angular position of said bail on said container.

3. A portable fluid container comprising integral supporting members, a vertically movable tray in said container, a hinged cover for said container, a carrying-bail pivotally mounted on said container and having a plurality of angular positions relative thereto, link members pivotally connected to said bail and said cover and adapted to hold the cover in its closed position when the bail is in one of its positions and to lock the cover in its open position when the bail is in another of its positions, link members pivotally mounted on the side of the container and continuously engaging said tray, and levers secured directly to said bail and operatively engaging said second link members for raising and lowering said tray by lowering and raising the outer end of said bail.

In testimony whereof, I have hereunto subscribed my name this 2 day of Dec. 1920.

FRANK F. FORSHEE.